US006892277B1

(12) United States Patent
Bergsten

(10) Patent No.: US 6,892,277 B1
(45) Date of Patent: May 10, 2005

(54) SYSTEM AND METHOD FOR OPTIMIZING REMOTE DATA CONTENT DISTRIBUTION

(75) Inventor: James R. Bergsten, Danville, CA (US)

(73) Assignee: LSI Logic Corporation, Milpitas, CA (US)

( * ) Notice: Subject to any disclaimer, the term of this patent is extended or adjusted under 35 U.S.C. 154(b) by 564 days.

(21) Appl. No.: 09/966,867

(22) Filed: Sep. 28, 2001

(51) Int. Cl.[7] ............................................. G06F 12/08
(52) U.S. Cl. ..................................... 711/118; 711/144
(58) Field of Search ................................ 711/118, 162, 711/143, 144; 707/10; 709/213, 214, 219

(56) References Cited

U.S. PATENT DOCUMENTS

| | | | | |
|---|---|---|---|---|
| 5,764,906 A | * | 6/1998 | Edelstein et al. | 709/219 |
| 5,790,805 A | * | 8/1998 | Bantum | 709/248 |
| 5,802,297 A | * | 9/1998 | Engquist | 709/212 |
| 6,178,443 B1 | * | 1/2001 | Lin | 709/208 |
| 6,370,620 B1 | * | 4/2002 | Wu et al. | 711/132 |
| 6,442,651 B2 | * | 8/2002 | Crow et al. | 711/118 |
| 6,571,276 B1 | * | 5/2003 | Burns et al. | 709/212 |
| 6,591,266 B1 | * | 7/2003 | Li et al. | 707/10 |
| 6,675,205 B2 | * | 1/2004 | Meadway et al. | 709/219 |
| 2002/0029261 A1 | * | 3/2002 | Shibata | 709/219 |
| 2002/0052796 A1 | * | 5/2002 | Tadokoro et al. | 705/26 |
| 2002/0059080 A1 | * | 5/2002 | Kasirer et al. | 705/2 |
| 2002/0065829 A1 | * | 5/2002 | Neuhaus et al. | 707/100 |
| 2002/0082927 A1 | * | 6/2002 | Borenstein et al. | 705/21 |
| 2002/0128916 A1 | * | 9/2002 | Beinecke, III | 705/26 |
| 2003/0041045 A1 | * | 2/2003 | Sun | 707/1 |
| 2004/0066397 A1 | * | 4/2004 | Walker et al. | 345/719 |

OTHER PUBLICATIONS

Microsoft Press, Computer Dictionary, 1994, p. 390.*

* cited by examiner

Primary Examiner—Hiep T. Nguyen
(74) Attorney, Agent, or Firm—Suiter-West PC LLO

(57) ABSTRACT

The present invention discloses a system and method for optimizing remote data distribution. A system and method for optimizing remote data includes receiving a request for content at a first storage device. The first storage device may include a map which may be analyzed to determine if a copy associated with the content request is present at the first storage device. The map may include at least one map entry having an identifier suitable for describing a range of addressable data blocks. If a copy associated with the content request is initially present, the copy may be provided to a user that requested the content. If the requested content is not initially present, a copy of the content may be retrieved by the first storage device from a second storage device. After receipt of the copy, a map located at the first storage device may be updated to reflect storage of the copy of requested content at the first storage device.

20 Claims, 3 Drawing Sheets

US 6,892,277 B1

SYSTEM AND METHOD FOR OPTIMIZING REMOTE DATA CONTENT DISTRIBUTION

FIELD OF THE INVENTION

The present invention generally relates to the field of storage subsystems, and particularly to a system and method for optimizing remote data content distribution.

BACKGROUND OF THE INVENTION

Data retrieval and access to content continues to be an integral part of today's world. Almost any type of information can now be transmitted via an electronic form. As the amount of content stored in an electronic form continues to increase and require greater memory storage, it is imperative that data retrieval methods have a parallel increase in sophistication levels as well. Consumers continue to demand faster access to data at diverse locations, making it impractical to efficiently access data from a central source, especially when these data are read by a large number of users.

Attempts at increasing the data transmission rate have proven to be largely inadequate to fulfill the desired increased access rates for consumers. Currently, large amounts of data are replicated at a number of remote locations in efforts to reduce transmission time. However, replication of all data maintained at a certain repository is wasteful and unnecessary. Replication of data at a central repository utilizes a significant amount of bandwidth that could be utilized for other purposes.

SUMMARY OF THE INVENTION

Accordingly, the present invention is directed to a system and method for optimizing remote data distribution. In an embodiment of the present invention, a system and method for optimizing remote data includes receiving a request for content at a first storage device. The first storage device may include a map which may be analyzed to determine if a copy associated with the content request is present at the first storage device. The map may include at least one map entry having an identifier suitable for describing a range of addressable data blocks. If a copy associated with the content request is present at the first storage device, the copy may be provided to a user that requested the content. If the requested content is not present at the first storage device, a copy associated with the content request may be retrieved by the first storage device from a second storage device. After receipt of the copy from the second storage device, a map located at the first storage device may be updated to reflect storage of the copy associated with the content request.

In another embodiment of the invention, remote data content distribution may be optimized by replicating requested content. As users tend to request similar content, it may be unnecessary and wasteful to replicate all content. However, by replication of requested content, content may be provided to the user in a more efficient fashion without wasting bandwidth replicating all content. When an original copy of content may be updated at a second storage device, a token may be sent to the first storage device to invalidate a mirrored copy of the content stored at the first storage device or, alternatively, the second storage device may automatically transmit an updated copy of the content to the first storage device.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
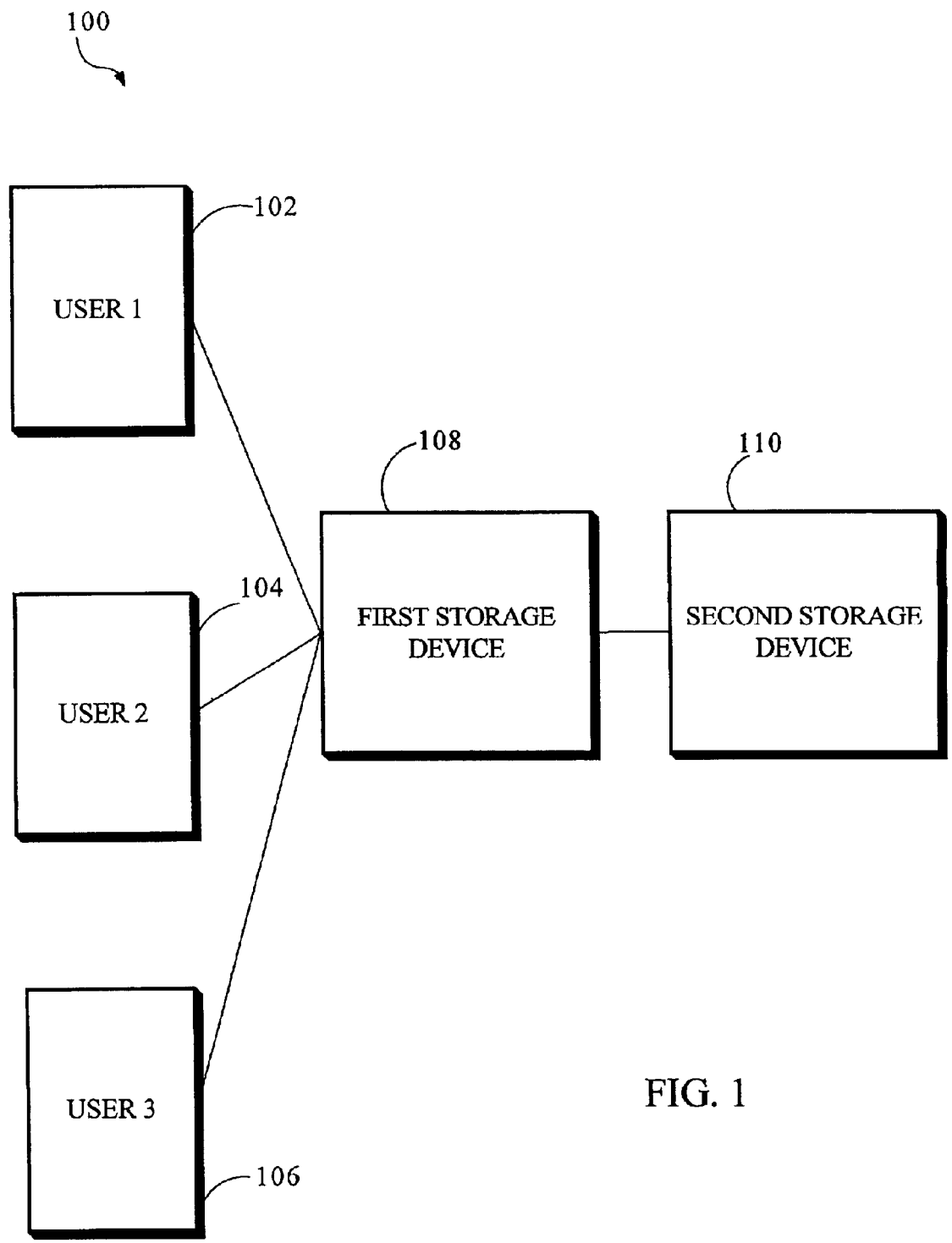
FIG. 1 depicts an embodiment of a block diagram of a system for optimizing remote content distribution in accordance with the present invention.

Referring generally now to FIG. 1, an embodiment of a system 100 for optimizing remote content distribution in accordance with the present invention is shown. A typical user 102 or plurality of users 102–106 may generate a content request which may be received by a first storage device 108. Content may be in the form of data, files, audio, video, and the like known to one of ordinary skill in the art. If the first storage device 108 contains a copy associated with the content request, the first storage device may provide the copy to the user 102. In the absence of a copy associated with the content request at the first storage device 108, a copy associated with the content request may be retrieved from a second storage device 110. A copy associated with the content request may be transmitted from the second storage device 110 to the first storage device 108, at which time, the copy may be delivered to user 102.

It should be understood that a copy associated with a content request may include data, files, audio, video, and the like known to one of ordinary skill in the art. If a content request desires particular information, the copy associated with the content request may include all data associated with the content request, thus may include various forms of data, files, audio, video, and the like. The second storage device 110, in an embodiment of the invention, may be a central repository for the storage of data. A central repository may be in the form of a central server in an embodiment of the invention. If a copy associated with the content request is not present at the first storage device 108, a copy associated with the content request may be generated at the second storage device 110 and transmitted to the first storage device 108. In an embodiment of the invention, first storage device 108 may be in the form of a local server. Users 102–106 may be capable of gaining access to a local server, wherein a local server may be capable of gaining access to a central server according to an embodiment of the invention.

In determining whether a copy associated with the content request is present at the first storage device 108, first storage device 108 may reference a map that is maintained at the first storage device 108. A map including a map entry having an identifier may be maintained at the first storage device 108. The map may describe a range of addressable data blocks. A map entry may have a number from zero to n, where n is a number of data or cache blocks in a range. In such a way, in an embodiment of the present invention, a map may provide a list of content stored at the first storage device and provide its location for retrieval.

An advantageous aspect of an embodiment of the system 100 of the present invention is the replication of requested content. A second storage device 110 may provide storage for a wide range of content. For example, the second storage device 110 may be a local repository system, such as a central server. The first storage device 108 may be a secondary device attached to the central server. While replication of content and data mirroring may be required in certain applications, it may not be desirable in other applications due to limited bandwidth and necessity. A particular piece of desired content may be popular with many users 102–106. When the desired content has been first requested, a copy associated with the content request may not be present at the first storage device 108. However, after the first request for the desired content has been made, a copy associated with the content request may be stored at the first storage device 108 as well as the second storage device 110. It should be recognized by those with ordinary skill in the art that this may be referred to as a pull copy. Later requests for desired content may be accomplished by the first storage device by referencing a map maintained at the first storage device 108 to access the copy associated with the content request and providing the copy to a user 102–106.

While it is disclosed that first storage device 108 and second storage device 110 may be a local server and central server respectively, it should be understood by those with ordinary skill in the art that other types of devices may be utilized without departing from the scope and spirit of the present invention. For example, first storage device 108 and second storage device 110 may be in the form of an information appliance, personal computer, mass storage, and the like, which provides copied data in the first storage device 108 to more than one client, in respective embodiments of the present invention.

Figure 2:
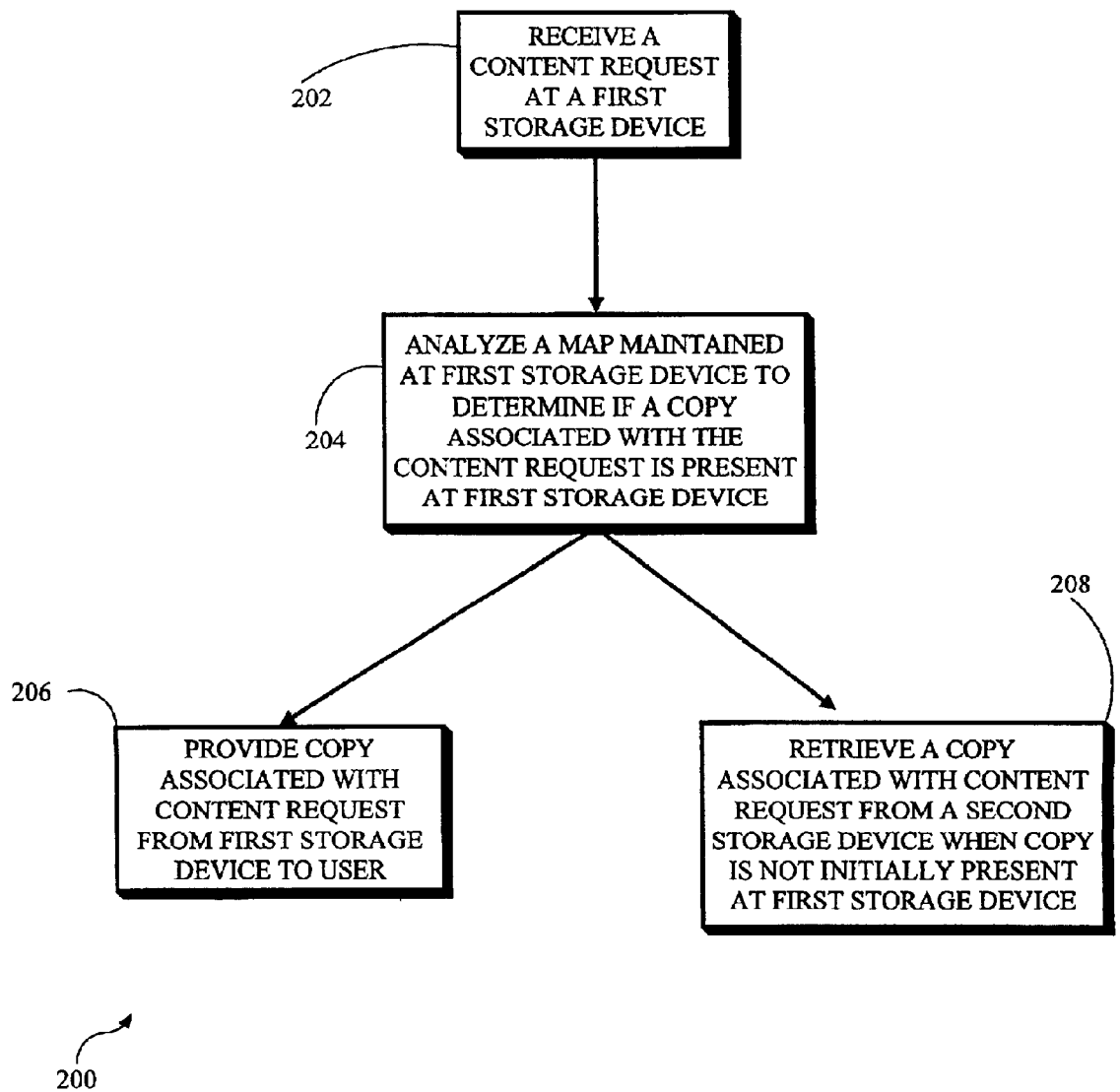
FIG. 2 depicts an embodiment of a process in accordance with the present invention.

Referring now to FIG. 2, an embodiment of a process 200 in accordance with the present invention is shown. Process 200 may be utilized in an embodiment of the present invention to efficiently provide a copy associated with a content request to a user. The process may begin when a first storage device may receive a content request 202. A map maintained at a first storage device may be analyzed to determine if a copy associated with the content request is present at the first storage device 204.

Upon an analysis of the map, if a copy associated with the content request is present at the first storage device, then the copy may be provided to a user 206. A copy associated with the content request may be retrieved from a second storage device when a copy associated with the content request is not initially present at the first storage device 208. When a copy associated with the content request may be retrieved from the second storage device to the first storage device, the map located at the first storage device may be updated to reflect the presence of the copy associated with the content request at the first storage device.

Figure 3:
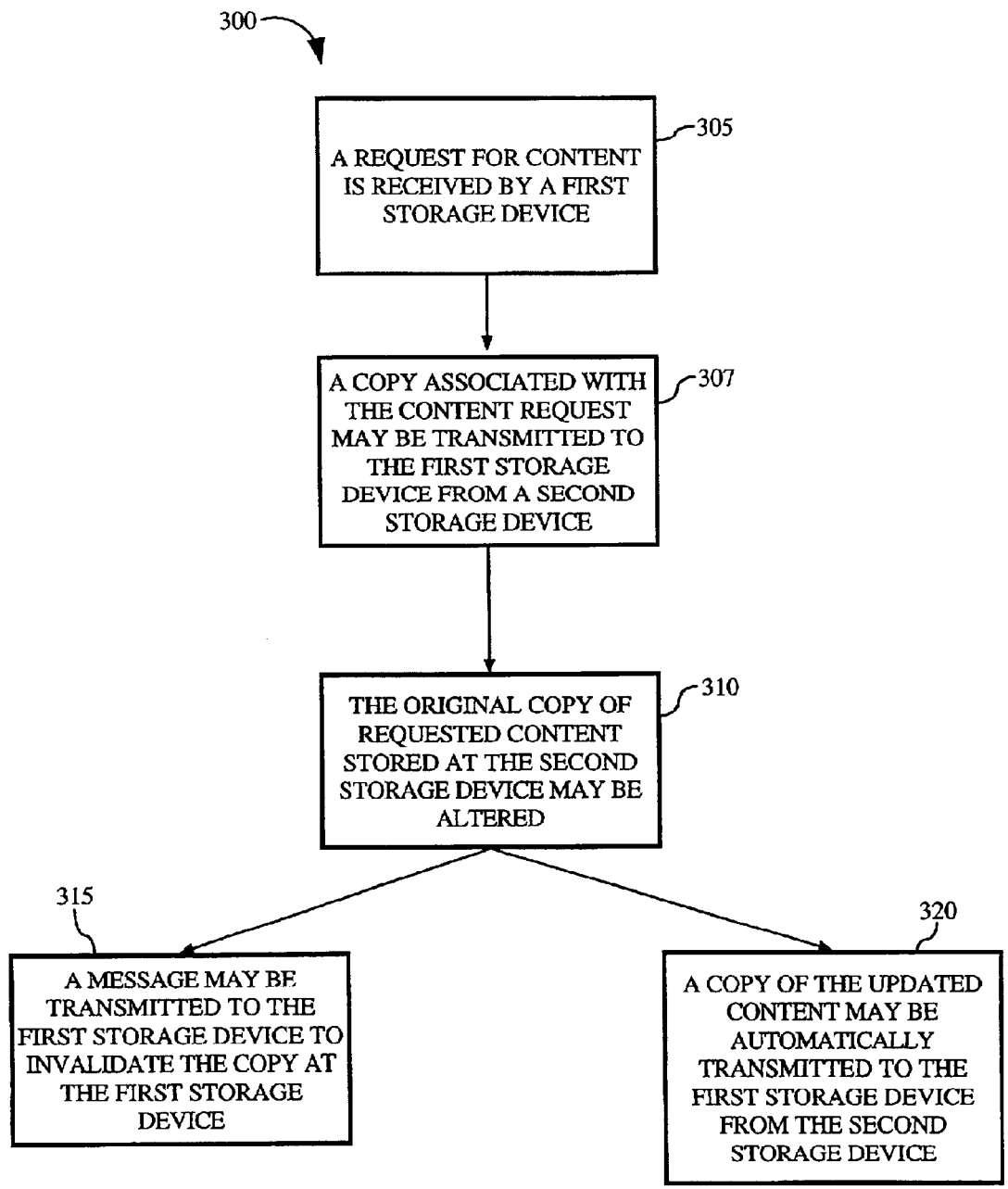
FIG. 3 depicts an embodiment of a process of ensuring that the copy of the content stored at a first storage device has been updated when the original copy of the same content has been altered at the second storage device in accordance with the present invention.

Referring now to FIG. 3, an embodiment of a process 300 of ensuring that the copy of the content stored at a first storage device has been updated when the original copy of the same content has been altered at the second storage device is shown. Process 300 may begin when a request for content has been received by a first storage device 305. As described in FIG. 2, upon execution of the request, a copy associated with the content request may be stored at the first storage device while the original copy associated with the content request may be stored at the second storage device 307. Content may be regularly or irregularly updated to provide the latest information. For example, a news web site may be regularly updated to provide the latest news. The original copy associated with the content request may be stored at the second storage device may be altered 310.

When the original copy associated with the content request has been altered, it may be desirable to ensure that later requests for the same content may obtain the latest updates to the requested content. This may be accomplished in one of several ways according to embodiments of the present invention. A message may be transmitted to the first storage device to invalidate the copy associated with the content request 315. Thus, upon another content request for the same content, the first storage device may retrieve a copy of the updated content from the second storage device. In an another embodiment of the present invention, a copy of the updated content may be transmitted to the first storage device automatically upon an update or according to desired user criteria 320. For example, a user or collection of users may desired that updated content be present at the first storage device at a regular interval, twice a day for example, based on the general access requirements for the users.

Another advantageous aspect of the present invention is the ability to verify that the connection between a first storage device and a second storage device is operating correctly. For example, in an embodiment of the present invention, a unique token may be passed between the first storage device and the second storage device to ensure that the map maintained at the first storage device is still valid. In another embodiment of the invention, the second storage device may instruct the first storage device to invalidate the entire map if a connection has been lost. This may ensure that the requested content a user may desire has been updated and is the latest version of the requested content.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing desired content, comprising:
   receiving a first content request at a first storage device, wherein the first storage device is accessible by more than one client;
   analyzing a map at said first storage device to determine if a copy associated with said first content request is present at said first storage device, said map including at least one map entry having an identifier suitable for describing a range of addressable data blocks, wherein the map entry corresponds to a data block stored in said first storage device;
   providing said copy associated with said first content request to a user; wherein said copy associated with said first content request is retrieved from a second storage device to said first device when said copy associated with said first content request is not initially present at said first storage device; and receiving a message at said first storage device from said second storage device when said copy associated with said first content request is present at said first storage device and is modified at said second storage device.

2. The method as claimed in claim 1, further comprising updating said map when said copy associated with said first content request is retrieved from a second storage device to said first storage device.

3. The method as claimed in claim 2, further comprising receiving a second content request, said second content request being the same as said first content request, wherein a copy associated with said second content request is provided to a user directly from said first storage device.

4. The method as claimed in claim 1, wherein said message invalidates said copy associated with said first content request at said first storage device.

5. The method as claimed in claim 4, further comprising updating said map at said first storage device when said copy associated with said first content request is invalidated.

6. The method as claimed in claim 1, wherein said message includes a modified copy associated with said first content request replacing said copy associated with said first content request at said first storage device.

7. The method as claimed in claim 1, wherein a modified copy associated with said first content request is received by said first storage device from said second storage device, said modified copy replacing said copy associated with said first content request; transfer of said modified copy associated with said first content request being based on a user-defined criteria.

8. The method as claimed in claim 1, further comprising passing a unique token between said first storage device and said second storage device, wherein said token assesses validity of the map stored in said first storage device.

9. The method as claimed in claim 8, wherein said token is capable of instructing said first storage device to invalidate said map at said first storage device.

10. A system for providing requested content comprising:
    a first storage device, wherein the first storage device is accessible by more than one client; and
    a second storage device operably connected to said first storage device; wherein said first storage device and said second storage device are suitable for receiving and storing information, wherein a map is stored at said first storage device, said map including at least one entry including an identifier suitable for describing a range of addressable data blocks, wherein said map is suitable for being utilized to provide a copy associated with a first content request to a user when said copy is located at said first storage device and capable of retrieving said copy from said second storage device to said first storage device when said copy is not initially present at said first storage device, said first storage device receiving a token from said second storage when said copy associated with said first content request is present at said first storage device and is modified at said second storage device.

11. The system as claimed in claim 10, wherein said map is updated when said copy of requested content is retrieved from said second storage device to said first storage device.

12. The system as described in claim 10, wherein a modified copy associated with said first content request is transmitted to said first storage device from said second storage device, said modified copy replacing said copy associated with said first content request; said modified copy associated with said first content request being transmitted based on a user-defined criteria.

13. The system as claimed in claim 10, wherein said token is passed between said first storage device and said second storage device, said token is capable for assessing validity of said map stored at said first storage device.

14. The system as claimed in claim 13, wherein said token is capable of instructing said first storage device to invalidate the map stored at said first storage device.

15. A method for providing requested content, comprising:
    receiving a first content request at a first storage device, wherein the first storage device is accessible by more than one client;
    analyzing a map at said first storage device including at least one map entry having an identifier suitable for describing a range of addressable data blocks, wherein the map entry corresponds to a data block stored in said first storage device;
    providing a copy associated with said first content request from said first storage device when said copy is initially present said first storage device to a user;
    retrieving said copy associated with said first content request from a second storage device when said copy is not initially present at said first storage device, said second storage device being operably connected to said first storage device;
    providing said second copy associated with said first content request when said copy is not initially present at said first storage device;
    updating said map stored at said first storage device to reflect current storage at said first storage device; and
    receiving a message at said first storage device from said second storage device when said copy associated with said first content request is present at said first storage device and is modified at said second storage device.

16. The method as claimed in claim 15, further comprising receiving a second content request, said second content request being the same as said first content request, wherein a copy associated with said second content request is provided to a user directly from said first storage device.

17. The method as claimed in claim 15, wherein said message invalidates said copy associated with said first content request at said first storage device.

18. The method as claimed in claim 17, further comprising updating said map at said first storage device when said copy associated with said first content request is invalidated.

19. The method as claimed in claim 15, wherein said message includes a modified copy associated with said first content request replacing said copy associated with said first content request at said first storage device.

20. The method as claimed in claim 15, wherein a modified copy associated with said first content request is received by said first storage device from said second storage device, said modified copy replacing said copy associated with said first content request; transfer of said modified copy associated with said first content request being based on a user-defined criteria.

* * * * *